(12) United States Patent
Trahan

(10) Patent No.: US 10,351,096 B2
(45) Date of Patent: Jul. 16, 2019

(54) AUTOMOBILE SEAT BELT HOLDER

(71) Applicant: Cecil D. Trahan, Lafayette, LA (US)

(72) Inventor: Cecil D. Trahan, Lafayette, LA (US)

( * ) Notice: Subject to any disclaimer, the term of this patent is extended or adjusted under 35 U.S.C. 154(b) by 0 days.

(21) Appl. No.: 15/672,585

(22) Filed: Aug. 9, 2017

(65) Prior Publication Data
US 2018/0361985 A1    Dec. 20, 2018

Related U.S. Application Data

(60) Provisional application No. 62/522,370, filed on Jun. 20, 2017.

(51) Int. Cl.
*B60R 22/24* (2006.01)
*B60R 22/12* (2006.01)
*B60R 22/26* (2006.01)
*B60R 22/02* (2006.01)
*B60R 22/18* (2006.01)

(52) U.S. Cl.
CPC .............. *B60R 22/24* (2013.01); *B60R 22/02* (2013.01); *B60R 22/12* (2013.01); *B60R 22/26* (2013.01); *B60R 2022/021* (2013.01); *B60R 2022/1818* (2013.01)

(58) Field of Classification Search
CPC ......... B60R 22/24; B60R 22/12; B60R 22/26; B60R 22/02; B60R 2022/021; B60R 2022/1818
See application file for complete search history.

(56) References Cited

U.S. PATENT DOCUMENTS

| 3,287,061 | A | * | 11/1966 | Nicholas | B60R 22/02 297/481 |
| 4,057,290 | A | * | 11/1977 | Arima | A44B 11/2546 24/307 |
| 4,531,762 | A | * | 7/1985 | Sasaki | B60R 22/03 280/801.1 |
| 5,607,185 | A | * | 3/1997 | Isaji | A44B 11/2503 280/806 |
| 5,685,567 | A | * | 11/1997 | Koujiya | B60R 22/1953 280/801.1 |
| 5,918,372 | A | * | 7/1999 | Materne | B60R 22/32 280/801.1 |
| 6,116,649 | A | * | 9/2000 | Compton | B60R 22/02 280/749 |
| 6,318,610 | B1 | * | 11/2001 | Doherty | A45F 5/02 224/269 |
| 6,851,714 | B2 | * | 2/2005 | Singer | B60R 22/24 280/801.1 |
| 7,357,419 | B2 | * | 4/2008 | Kock | B60R 22/48 180/268 |

(Continued)

*Primary Examiner* — Robert Sandy
*Assistant Examiner* — Louis A Mercado
(74) *Attorney, Agent, or Firm* — Dunlap Bennett & Ludwig PLLC

(57) ABSTRACT

A seat belt holder is provided for securing a latch plate of an associated unused seat belt to the molding around the base of the automobile seat, thereby preventing the latch plate from annoyingly rattling around when the vehicle is in motion. The seat belt holder includes a body providing a snap fit tab and an opposing latch plate receptacle. The latch plate receptacle is adapted to removably engage the latch plate, while the snap fit tab is adapted to removably snap connect to various molding elements of automobile seats.

9 Claims, 5 Drawing Sheets

(56) References Cited

U.S. PATENT DOCUMENTS

2006/0279130 A1* 12/2006 Webber ............... B60R 22/1952
                                                                  297/469
2017/0259777 A1* 9/2017 Shimizu ................ B60R 22/20
2018/0208150 A1* 7/2018 Jimenez Hernandez ...................
                                                                B60R 22/48

* cited by examiner

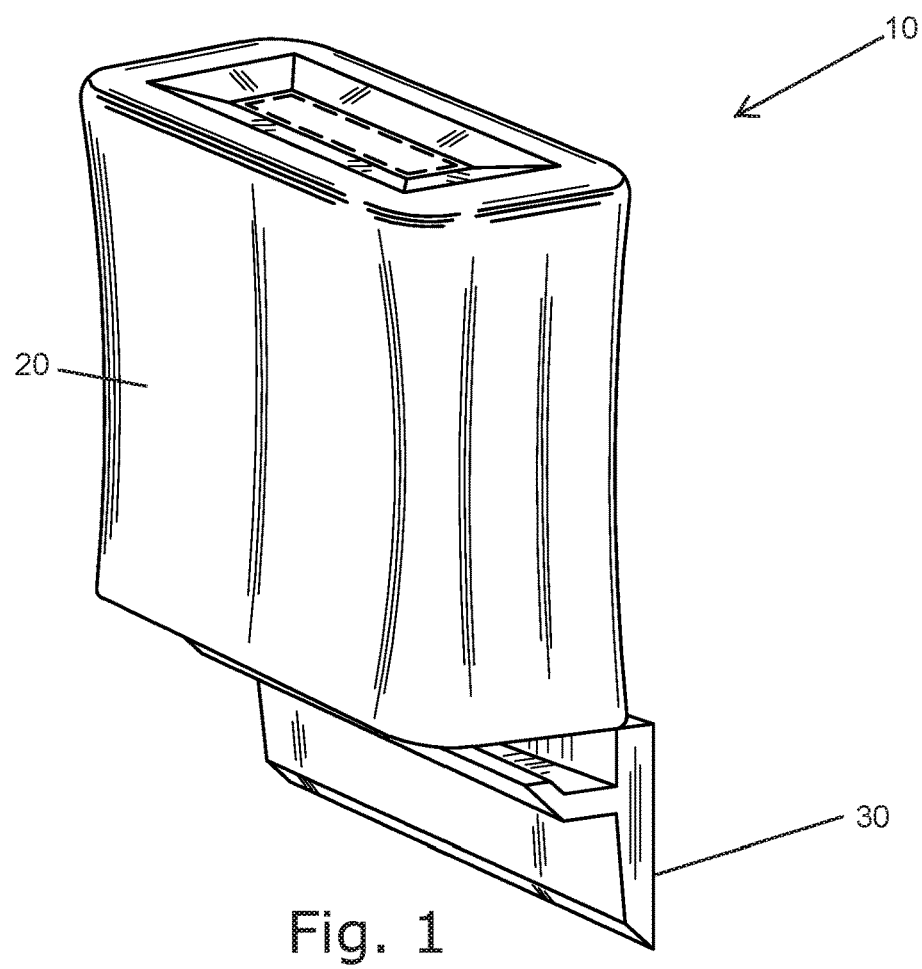
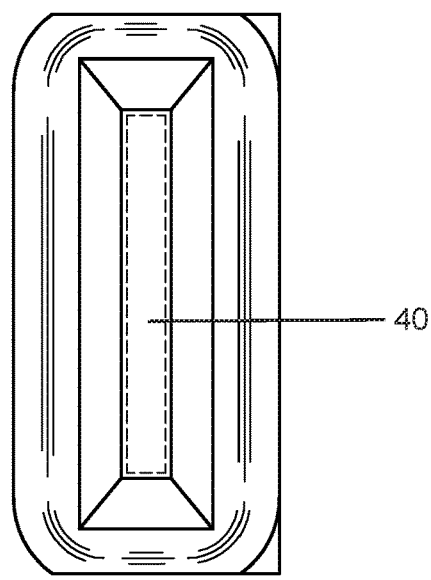
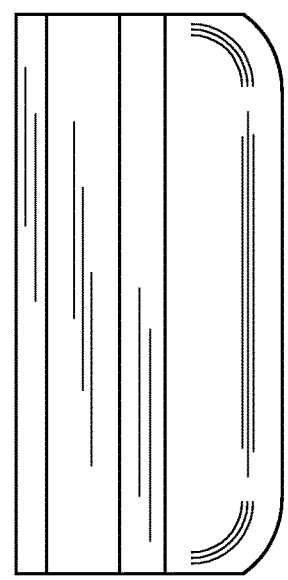
Fig. 1
Fig. 2
Fig. 3

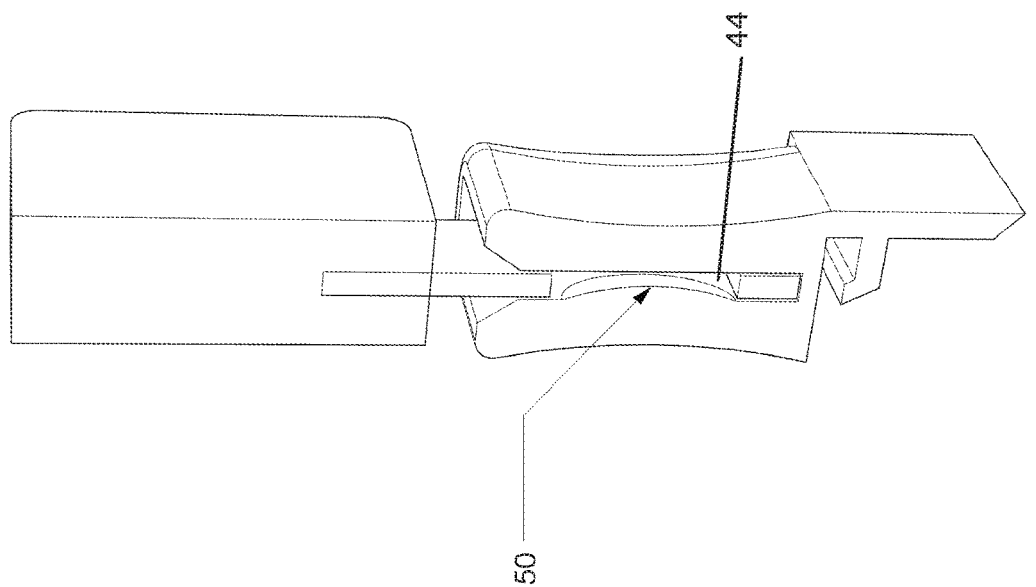

AUTOMOBILE SEAT BELT HOLDER

CROSS-REFERENCE TO RELATED APPLICATION

This application claims the benefit of priority of U.S. provisional application No. 62/522,370, filed 20 Jun. 2017, the contents of which are herein incorporated by reference.

BACKGROUND OF THE INVENTION

The present invention relates to seat belts and, more particularly, an automobile seat belt holder for securing an unused seat belt latch plate to the molding around the base of the automobile seat.

Automobiles and their seat belts being necessities of modern life, and so are some of their annoyances. For example, the rattling noise caused by a loose seat belt clip hitting on or along a door frame or seat when the vehicle is in motion.

As can be seen, there is a need for an automobile seat belt holder for securing a seat belt latch plate to the molding around the base of the automobile seat, thereby eliminating the rattling noise caused by a loose seat belt clip hitting on a door frame or seat when the vehicle is in motion.

SUMMARY OF THE INVENTION

In one aspect of the present invention, an automobile seatbelt holder includes a body; a latch plate receptacle provided by the body; and a snap fit connector provided by the body.

In another aspect of the present invention, the automobile seatbelt holder includes a body extending from a first end to an opposing second end; at least one side of the body being concaved throughout extension between the first and second ends; a latch plate receptacle provided by the first end, wherein the latch plate receptacle communicates to an interior portion of the body providing a convex portion to removably engage a latch plate of an automobile seatbelt; and a snap fit connector provided by the second end, the snap fit connector includes a flange extending perpendicularly from a periphery of the body; a clip portion extending from the flange; and a hook portion transversely extending from a distal end of the clip portion in the direction of the body.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention;

FIG. 2 is a top plan view of an exemplary embodiment of the present invention;

FIG. 3 is a bottom plan view of an exemplary embodiment of the present invention;

FIG. 9 is a section perspective view of an exemplary embodiment of the present invention, shown in use.

DETAILED DESCRIPTION OF THE INVENTION

Figure 4:
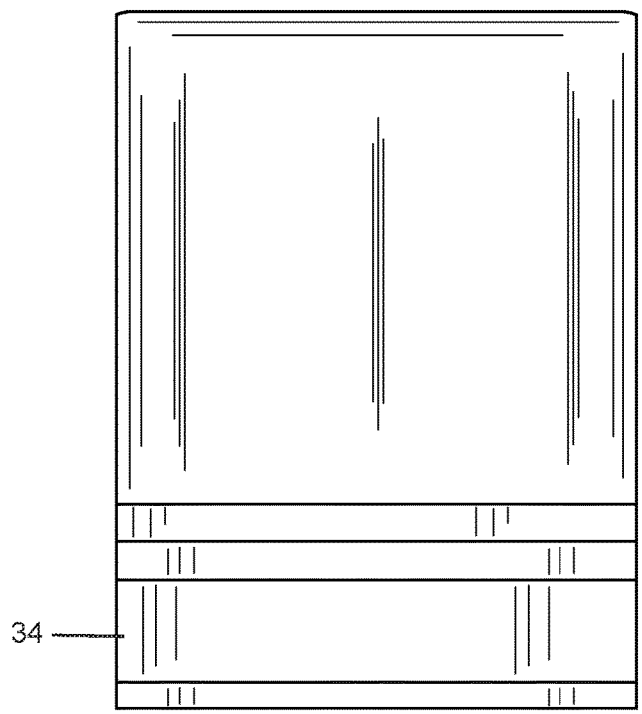
FIG. 4 is a front elevation view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the present invention.

Broadly, an embodiment of the present invention provides a seat belt holder for securing a latch plate of an associated unused seat belt to the molding around the base of the automobile seat, thereby preventing the latch plate from annoyingly rattling around when the vehicle is in motion. The seat belt holder includes a body providing a snap fit tab and an opposing latch plate receptacle. The latch plate receptacle is adapted to removably engage said latch plate, while the snap fit tab is adapted to removably snap connect to various molding elements of automobile seats.

Referring now to FIGS. 1 through 9, the present invention provides a seat belt holder 10 having a body 20, a snap fit tab 30, and a latch plate receptacle 40. The body 20 and snap fit tab 30 may a unitary construction of thermoplastic elastomer or other sufficiently strong, durable, non-metallic (to prevent a rattling noise) material. The latch plate receptacle 40 may provide a slot communicating to an interior portion 44 of the body 20 adapted to removably engage a latch plate 42 of a conventional seat belt 12, wherein the latch plate receptacle 40 is dimensioned to receive the latch plate 42 therethrough. The interior portion 44 may provide a convex portion 50 dimensioned and adapted to removably retain the latch plate 42, as illustrated in FIG. 9.

Figure 8:
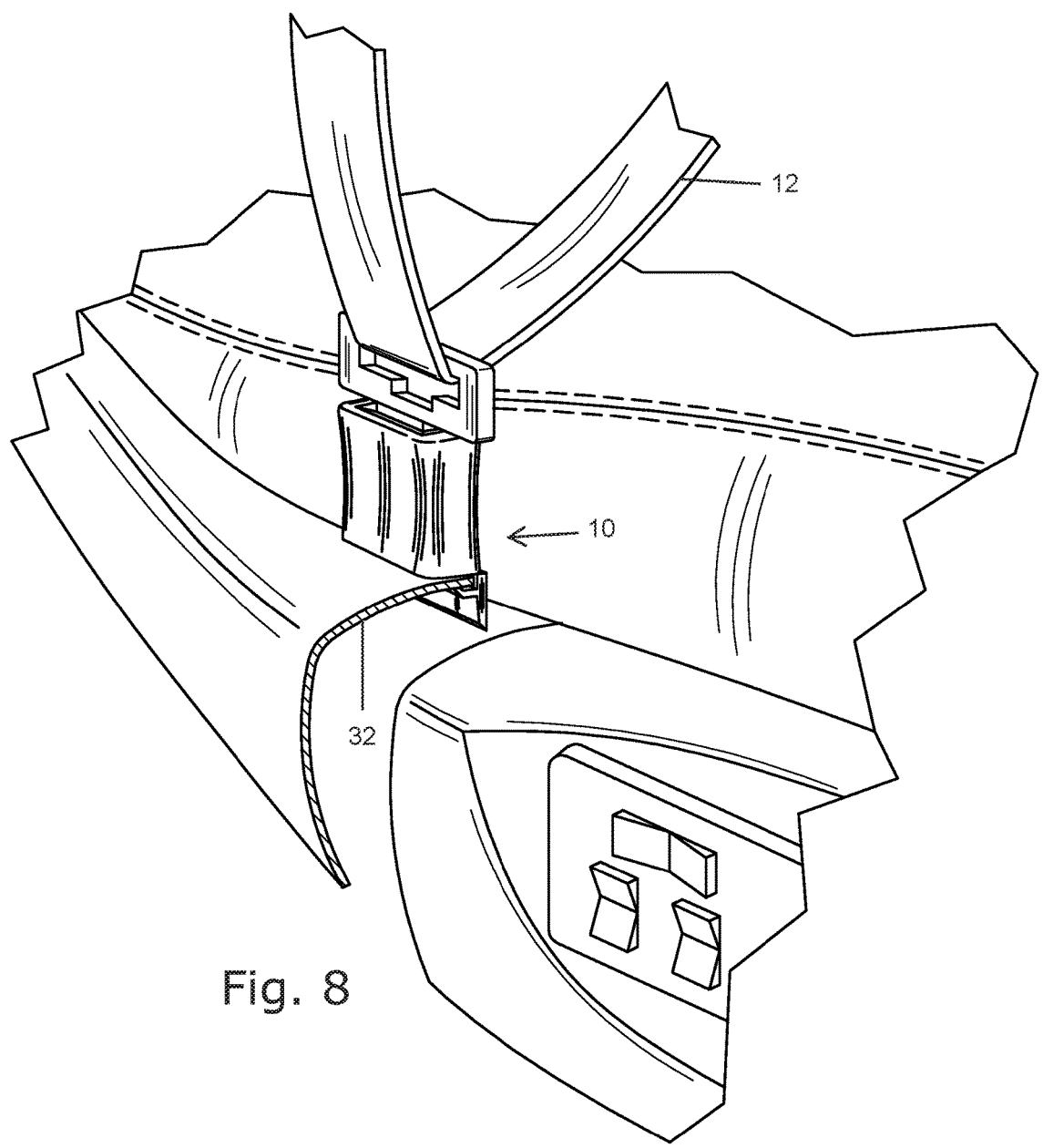
FIG. 8 is a perspective view of an exemplary embodiment of the present invention, shown in use.

The body 20 may have a tapered rectangular shape, though cylindrical, oval, square, triangular or other geometric shape are a possibility so long as the body 20 functions in accordance with the present invention as described herein. Namely, the body 20 may provide a tapered portion 22 and/or concave side portions to accommodate or "hug" seat and/or molding elements when in use, as illustrated in FIG. 8.

Figure 5:
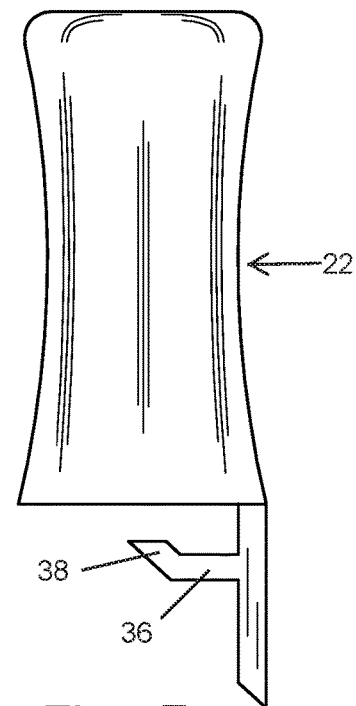
FIG. 5 is a side elevation of an exemplary embodiment of the present invention.
Figure 6:
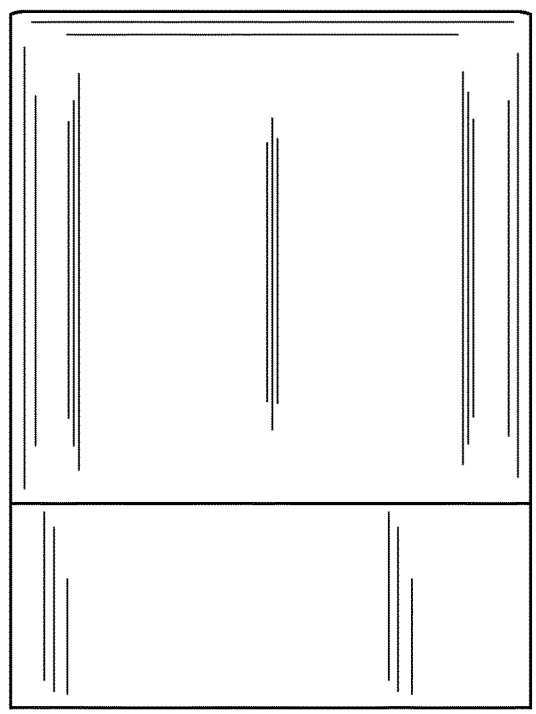
FIG. 6 is a rear elevation view of an exemplary embodiment of the present invention.

On the opposing side of the latch plate receptacle 40 the snap fit tab 30 may be disposed. The snap fit tab 30 may be adapted to attach the body 20 to the plastic molding 32 around the base of an automobile seat, as illustrated in FIG. 8. The snap fit tab 30 may have a flange 34 extending perpendicularly from a periphery of the body 20, thereby the flange 34 is adapted to keep the seat belt holder 10 in an upright orientation during use. A clip portion 36 may extend perpendicularly from the flange 34 in a direction over the body 20, as illustrated in FIG. 5. The clip portion 36 may have a hook portion 38 transversely extending from a distal end thereof in the direction of the body 20, wherein the clip portion 36 is biased in an engaged configuration, whereby the clip and hook portions 36 and 38 are adapted to snap fit on planar elements, such as those found on the molding 32 of automobile seats.

Figure 7:
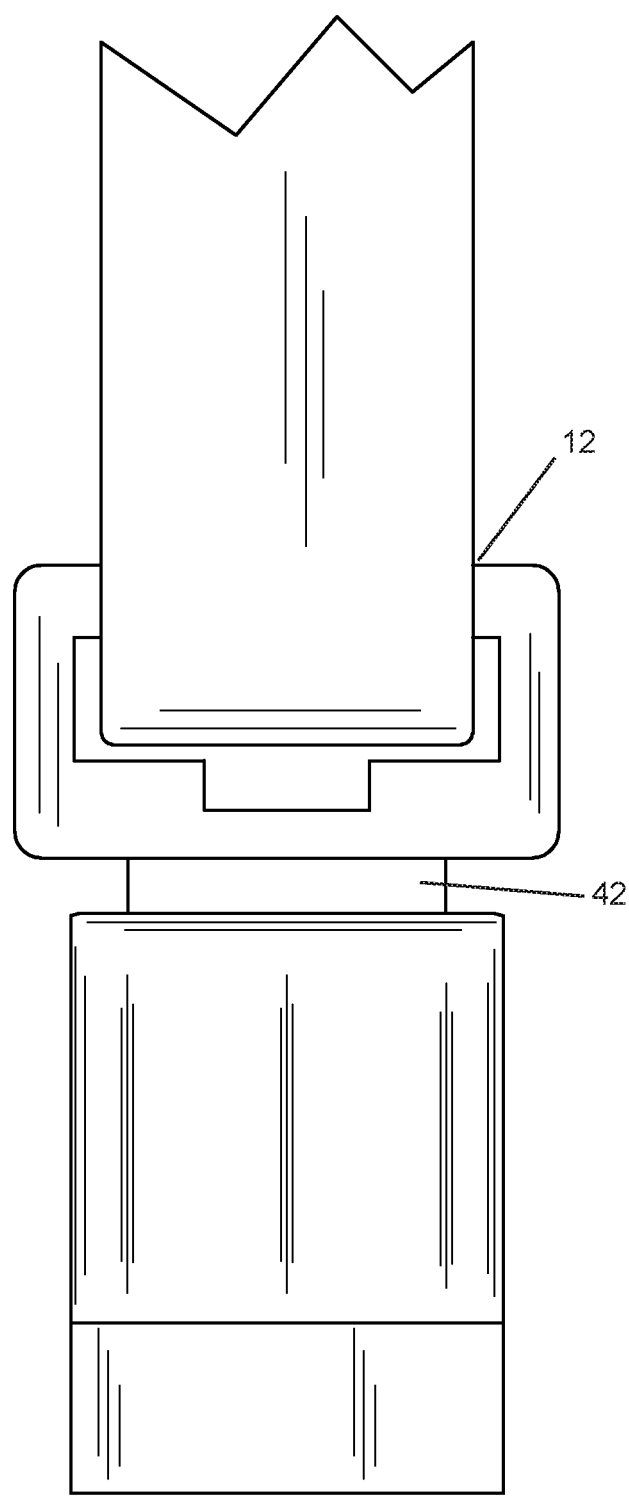
FIG. 7 is a rear elevation view of an exemplary embodiment of the present invention.

A method of using the present invention may include the following. Providing the seat belt holder 10 disclosed above. A user may securely (yet removably) engage the latch plate 42 of a loose seat belt 12 by sliding the former into the latch plate receptacle 40, as illustrated in FIG. 7. Then the user may snap the snap fit tab 30 onto the plastic molding 32 around the base of the seat. These two steps may be reversed.

In any event, the latch plate 42 of the loose seat belt 12 cannot rattle about when the seat is unoccupied and the vehicle in motion.

It should be understood, of course, that the foregoing relates to exemplary embodiments of the invention and that modifications may be made without departing from the spirit and scope of the present invention.

What is claimed is:

1. An automobile seatbelt holder, comprising:
   a body, wherein the body has at least one concaved side for facilitating securement to an interior of an automobile;
   a latch plate receptacle provided by the body; and
   a snap fit connector provided by the body, wherein the snap fit connector further comprises:
      a flange extending from a periphery of the body;
      a clip portion extending from the flange; and
      a hook portion transversely extending from a distal end of the clip portion in a direction toward the body.

2. The automobile seatbelt holder of claim 1, wherein the latch plate receptacle is adapted to removably secure a latch plate of an automobile seatbelt.

3. The automobile seatbelt holder of claim 1, wherein the latch plate receptacle communicates to an interior portion of the body providing a convex portion to removably engage a latch plate of an automobile seatbelt.

4. The automobile seatbelt holder of claim 1, wherein the snap fit connector is adapted to removably secure to an inner portion of an automobile.

5. The automobile seatbelt holder of claim 1, wherein the snap fit connector is biased to snap fit on a planar element of a molding of an automobile seat.

6. The automobile seatbelt holder of claim 5, wherein the flange extends perpendicularly from the periphery of the body so as to keep the seat belt holder in an upright orientation during use.

7. The automobile seatbelt holder of claim 1, wherein the at least one concaved side is two opposing concaved sides.

8. The automobile seatbelt holder of claim 1, wherein the body provides the latch plate receptacle and the snap fit connector on opposing ends thereof.

9. An automobile seatbelt holder, comprising:
   a body extending from a first end to an opposing second end;
   at least one side of the body being concaved throughout extension between the first and second ends;
   a latch plate receptacle provided by the first end, wherein the latch plate receptacle communicates to an interior portion of the body providing a convex portion to removably engage a latch plate of an automobile seatbelt; and
   a snap fit connector provided by the second end, the snap fit connector comprising:
      a flange extending perpendicularly from a periphery of the body;
      a clip portion extending from the flange; and
      a hook portion transversely extending from a distal end of the clip portion in a direction toward the body.

\* \* \* \* \*